US008385547B2

(12) United States Patent
Rohde et al.

(10) Patent No.: US 8,385,547 B2
(45) Date of Patent: Feb. 26, 2013

(54) METHOD AND APPARATUS FOR SECURE DIGITAL COMMUNICATIONS USING CHAOTIC SIGNALS

(75) Inventors: Gustavo K. Rohde, Pittsburgh, PA (US); Jonathan M. Nichols, Crofton, MD (US); Frank Bucholtz, Crofton, MD (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 1259 days.

(21) Appl. No.: 11/853,012

(22) Filed: Sep. 10, 2007

(65) Prior Publication Data

US 2008/0107268 A1 May 8, 2008

Related U.S. Application Data

(60) Provisional application No. 60/824,931, filed on Sep. 8, 2006.

(51) Int. Cl.
*H04L 9/00* (2006.01)
(52) U.S. Cl. .......................... 380/263; 380/252
(58) Field of Classification Search .................. 380/263, 380/252–255; 375/307, 309
See application file for complete search history.

(56) References Cited

U.S. PATENT DOCUMENTS

| | | | | |
|---|---|---|---|---|
| 6,744,893 | B1 * | 6/2004 | Fleming-Dahl | 380/263 |
| 6,854,058 | B2 * | 2/2005 | Carroll | 713/168 |
| 7,010,126 | B1 * | 3/2006 | Kim | 380/263 |
| 7,463,103 | B2 * | 12/2008 | Lee et al. | 331/78 |
| 8,103,002 | B2 * | 1/2012 | Kim et al. | 380/263 |

OTHER PUBLICATIONS

Chungyong Lee, Douglas B. Williams, Jaejin Lee, "A Secure Communication System Using Chaotic Switching", World Scientific Publishing Company, International Journal of Bifurcation and Chaos, vol. 7, No. 6 (1997), pp. 1383-1394.*
Kocarev, L. et al, "General Approach for Chaotic Synchronization with Applications to Communication", Jun. 19, 1995, The American Physical Society, Physical Review Letters, vol. 74, No. 25, pp. 5028-5031.*
E. Ott, Chaos in Dynamical Systems, Cambridge University Press, pp. 1-21, 1993.
F. Takens, "Detecting Strange Attractors in turbulence", Lecture Notes in Mathematics, Springer, V 898, pp. 366-381, 1981.
N.D. Sidiropoulos et al., "Tracking a frequency hopped signal using particle filtering", ICASSP 2006 Proceedings, 1660581,vol. 3, pp. III25-III28, May 2006.
S. Hayes et al., "Communication with chaos", Physical Review Letters, vol. 70, pp. 3031-3034, 1993.

(Continued)

*Primary Examiner* — Jeffrey D Popham
*Assistant Examiner* — Daniel Potratz
(74) *Attorney, Agent, or Firm* — Amy Ressing; Sally A. Ferrett (57) ABSTRACT

A system and method for encoding zero and one bits for transmission, including generating a first signal from a non-linear chaotic system to represent the one bit, with the signal's embedded vectors being within the non-linear system's attractor set, and generating a second signal from the non-linear system to represent the zero bit, with the signal's embedded vectors being outside the non-linear system's attractor set. The second signal encoding the zero bit can be generated by adding together two chaotic signals arising from the non-linear system initialized with different initial conditions, and weighting the second signal to have approximately the same energy as the first signal. One suitable chaotic systems is a Lorenz system. Systems and methods for decoding a transmitted stream of signals compare a detection statistic of the received stream of signals to a threshold value that depends on the chaotic system.

9 Claims, 5 Drawing Sheets

OTHER PUBLICATIONS

Y. Hwang et al., "Physical-layer secrecy AWGN via a class of chaotic DS/SS systems: analysis and design", IEEE Transactions on Signal Processing, vol. 52, pp. 2637-2649, Sep. 2004.

B.M. Dissinger, G.K. Rohde, R.B. Rhodes Jr., F. Bucholtz, "Intensity Analysis of Recurrence Plots for the Detection of Deterministic Signals in Noise", Naval Research Laboratory Report NRL/MR/5650-06-9004, pp. 1-25, Dec. 2006.

G.K. Rohde, D.M. Healy, Jr., C.A. Berenstein, A. Aldroubi, D. Rockmore, "Stochastic Analysis of Geometric Image Processing Using B-Splines", Acoustics Speech and Signal Processing ICASSP International Conference on, 1661451, pp. V-1017-V1020, 2006.

G. K. Rohde, C.A. Berenstein, D.M. Healy Jr., "Measuring image similarity in the presence of noise", Medical Imaging 2005, Proc. SPIE, vol. 5747, pp. 132-143, Apr. 2005.

* cited by examiner

METHOD AND APPARATUS FOR SECURE DIGITAL COMMUNICATIONS USING CHAOTIC SIGNALS

CROSS-REFERENCE TO RELATED APPLICATIONS

This Application is a non-provisional application of provisional (35 USC 119(e)) application 60/824,931 filed on Sep. 8, 2006.

BACKGROUND

1. Field of the Invention

This application is related to the field of digital communications, and more particularly, to the field of secure digital communications.

2. Description of Related Art

Digital communications entails encoding a particular message onto carrier analog signals with different properties, and, at the receiving end, decoding the message based on the properties of the received signal.

Phase shift keying and frequency shift keying are digital signaling techniques discussed in R. N. McDonough & A. D. Whalen, Detection of Signals in Noise, 2nd ed., 1995. These techniques, however, can allow an eavesdropper to relatively easily decode the message. Spread spectrum techniques such as frequency hopping can be used to increase the privacy of the communications link. However, even these messages can be exposed using time-frequency signal analysis methods such as short time Fourier transform, Wigner-Ville distribution, and Wavelet transforms. Particle filtering methods described in N. D. Sidropoulos et al., "Tracking a frequency hopped signal using particle filtering", ICASSP 2006 Proceedings, pp. 25-28 can be used to automatically track the frequency of a signal.

The relatively weak security of common methods can be attributed to the reliance of most modern communication protocols on the theory of linear vector spaces. For example, commonly used carrier analog signals s(t) can be analyzed using a linear decomposition $$s(t) \approx \sum_{k=1}^{\infty} c_k \varphi_k(t)$$

where $\Phi(t), k=1, \ldots, \infty$ form a complete representation of the space of finite energy functions. These functions can be, for example, simple sinusoids of differing frequency and phase, Gabor atoms, Wavelets, etc. Signal detection and demodulation can be done by computing the coefficients $c_k$ of the linear expansion and noting that these are different messages.

Several communications protocols use chaos. One of these protocols is described in S. Hayes et al., "Communication with chaos", Physical Review Letters, vol. 70, pp. 3031-3034, 1993. This protocol depends on chaotic synchronization. Another protocol, described in Y. Hwang et al., "Physical-layer secrecy AWGN via a class of chaotic DS/SS systems: analysis and design", IEEE Transactions on Signal Processing, Vol. 52, pp. 2637-2649, 2004, depends on the knowledge and ability to implement initial conditions exactly. These complications can make implementation difficult.

BRIEF SUMMARY OF THE INVENTION

One aspect of the invention is directed to a system and method for encoding zero and one bits for transmission, including generating a first signal from a non-linear chaotic system to represent the one bit, with the signal's embedded vectors being within the non-linear system's attractor set, and generating a second signal from the non-linear system to represent the zero bit, with the signal's embedded vectors being outside the non-linear system's attractor set. The second signal encoding the zero bit can be generated by adding together two chaotic signals arising from the non-linear system initialized with different initial conditions, and weighting the second signal to have approximately the same energy as the first signal.

Systems and methods for decoding a transmitted stream of signals compare a detection statistic of the received stream of signals to a threshold value that depends on the chaotic system.

The method can also include weighting at least one of the first signal and the second signal so the first signal and the second signal have approximately equal energy.

In an exemplary embodiment, generating of the second signal is accomplished by adding together two chaotic signals arising from the non-linear system initialized with different initial conditions.

In an exemplary embodiment, the non-linear chaotic system is a Lorenz, Rossler, or Henon system. The method can also include frequency translating the encoded bits, transmitting a plurality of encoded bits, receiving the transmitted plurality of encoded bits, and determining whether each signal portion corresponds to a zero bit or a one bit based on a detection statistic to a threshold value, said threshold value incorporates parameters of the chaotic system equations.

Another aspect of the invention is directed to a method and system for decoding a received transmission, said transmission being encoded with signals generated by a chaotic system. The method includes digitally sampling a received signal at a time interval $\tau$, splitting the signal of length N into windows of a predetermined width d, calculating a detection statistic $$q^2 = \sum_{m=1}^{N/d} |\hat{x}_m|^2$$

wherein $\hat{x}_m = \{r(m\tau), \ldots, r(m\tau+(d-1)\tau)\}$, comparing the detection statistic to a threshold value, and assigning a bit zero or a bit one based on the comparison of the detection statistic to the threshold value.

Other aspects of the invention will be apparent from the following drawings and the following description.

DETAILED DESCRIPTION OF THE INVENTION

Embodiments of the invention described herein include a novel binary digital communications protocol using chaotic signals.

One advantage of the binary digital communication protocol described herein is that the method does not synchronization or knowledge of initial conditions. In addition, the protocol cannot be demodulated using well known linear expansions.

Chaotic time domain signals arise from the solutions of nonlinear-differential equations in the continuous case, or difference equations in the discrete case. Some properties of chaotic time series are that they are aperiodic, and thus, have a continuous, normally spread spectrum, and that the distance between phase space points increases exponentially with time. Given slightly different initial conditions, two signals generated from the chaotic linear system quickly become uncorrelated. Thus, chaotic signals have a complex structure making them difficult to predict over time.

If $s(t) \in R^Q$ represents the a set of solutions to a nonlinear chaotic equation $$\frac{ds(t)}{dt} = F_\theta(s(t))$$

for some initial condition $s(0)$, after transients have subsided, the signal $s(t)$ lies in a compact subset $C \subset R^Q$, denoted the attractor set. The symbol $\theta$ refers to a set of parameters describing the nonlinear function F. Normally only one component $s(t)$ of the set $s(t)$ is used. In this case, the attractor C can be reconstructed via a method of delay embedding. More specifically, the attractor set can be reconstructed by embedding the time domain signal $s(t)$ onto a d-dimensional space through the method of delay reconstruction. The phase space reconstruction is given by plotting $g(t)=\{s(t), s(t+\tau), \ldots, s(t+(d-1)\tau)\}$ for all time points. If d is greater than equal to $2Q+1$, then the reconstructed attractor $\tilde{C}$ is a diffeomorphism of C.

One aspect of the invention is directed to a simple binary digital communications protocol that encodes bit zero and bit one with chaotic signals having similar spectral profiles, distinguishable because the signal encoding bit one is in the attractor set C, and the signal encoding bit zero is not in the attractor set C.

For a chaotic system of equations, the attractor set C can be represented as a cone $\alpha g$ which $g \in G$.

Given a specific nonlinear system F and its associated attractor set C, the bit zero can be represented by a signal whose embedded vectors do not belong to the attractor set C while bit one is represented by a signal whose embedded vectors do belong to C. Bit one can be generated by using a signal arising from the nonlinear system F. One method for generating a bit one is to initialize the nonlinear system F with random initial conditions. The bit zero should be encoded with a signal having a similar Fourier spectrum but whose embedded vectors do not belong to C. C, in general, is not a linear space or convex set. Therefore, bit zero can be generated by simply adding together two chaotic signals also arising from the nonlinear system F, initialized with different initial conditions.

Figure 1A:
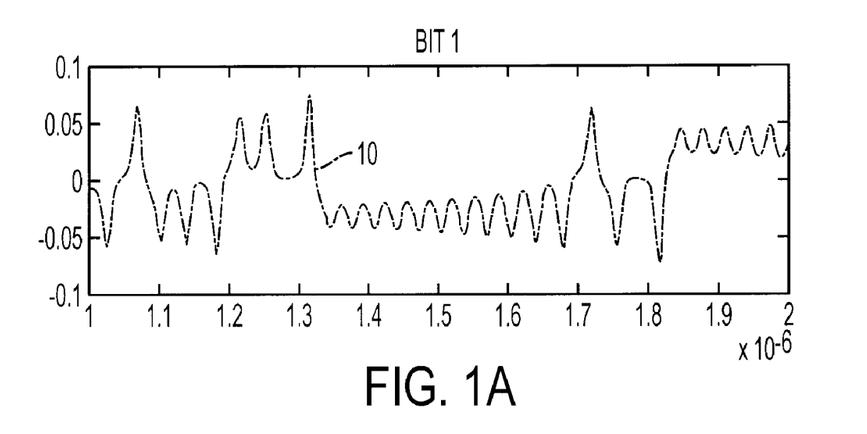
FIG. 1A and FIG. 1B illustrate signals encoding bits zero and one according to an embodiment of the invention.
Figure 1B:
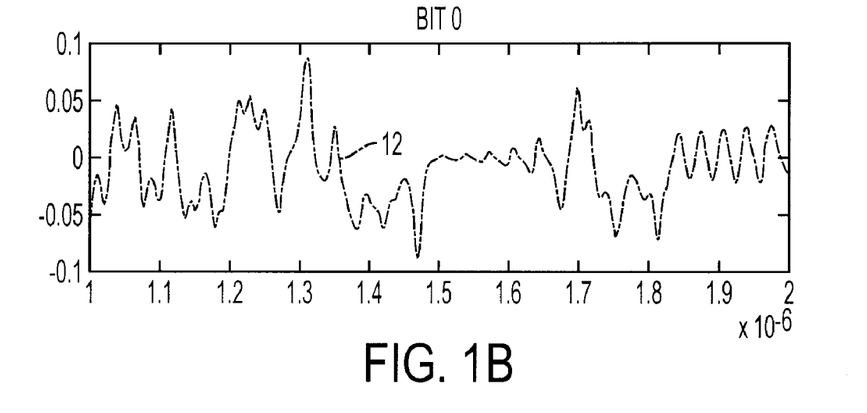

FIG. 1A illustrates the bit one encoded by a single signal 10 arising from the a Lorenz dynamical chaotic system. FIG. 1B illustrates a signal 12 that encodes bit zero that is constructed by adding two signals arising from the same Lorenz dynamical chaotic system. The two signals are weighted so that the energy of the resulting signal that encodes bit zero is the same as the energy of the signal encoding bit one. One method reducting the energy of the signal 12 to a desirable level is to divide the signal in half. Note that no noise is added to the signals of FIGS. 1A and 1B. The durations of the signal portions in FIGS. 1A and 1B is approximately $2 \times 10^{-6}$ seconds (2 microseconds).

Figure 2A:
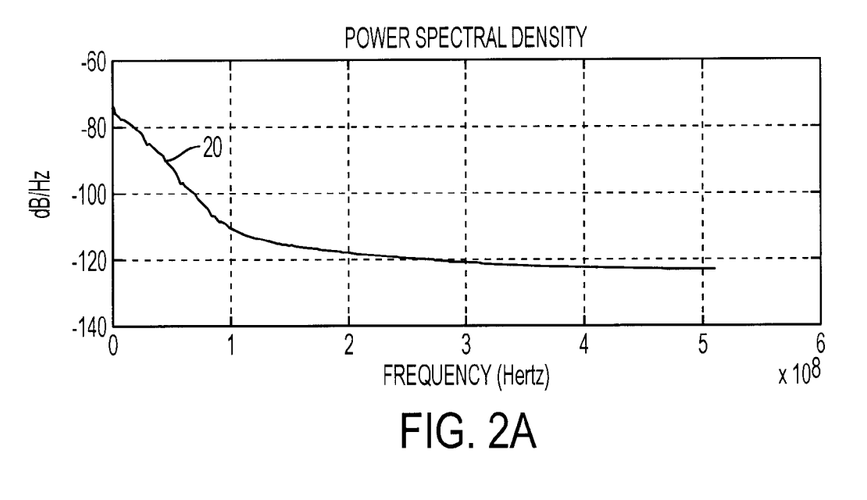
FIGS. 2A and 2B illustrate the power spectral densities for the chaotic signals of FIGS. 1A and 1B.
Figure 2B:
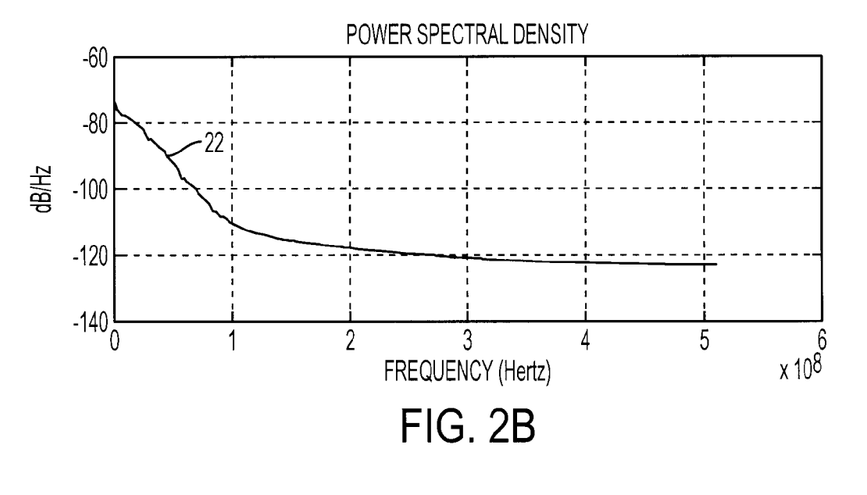

FIG. 2A illustrates an estimated Fourier spectrum 20 of the signal 10 encoding bit 1 shown in FIG. 1A computed using the periodogram method. FIG. 2B illustrates an estimated Fourier spectrum 22 of the signal 12 encoding bit 0 shown in FIG. 1B computed using the periodogram method. The signal energies are approximately equal.

Figure 3:
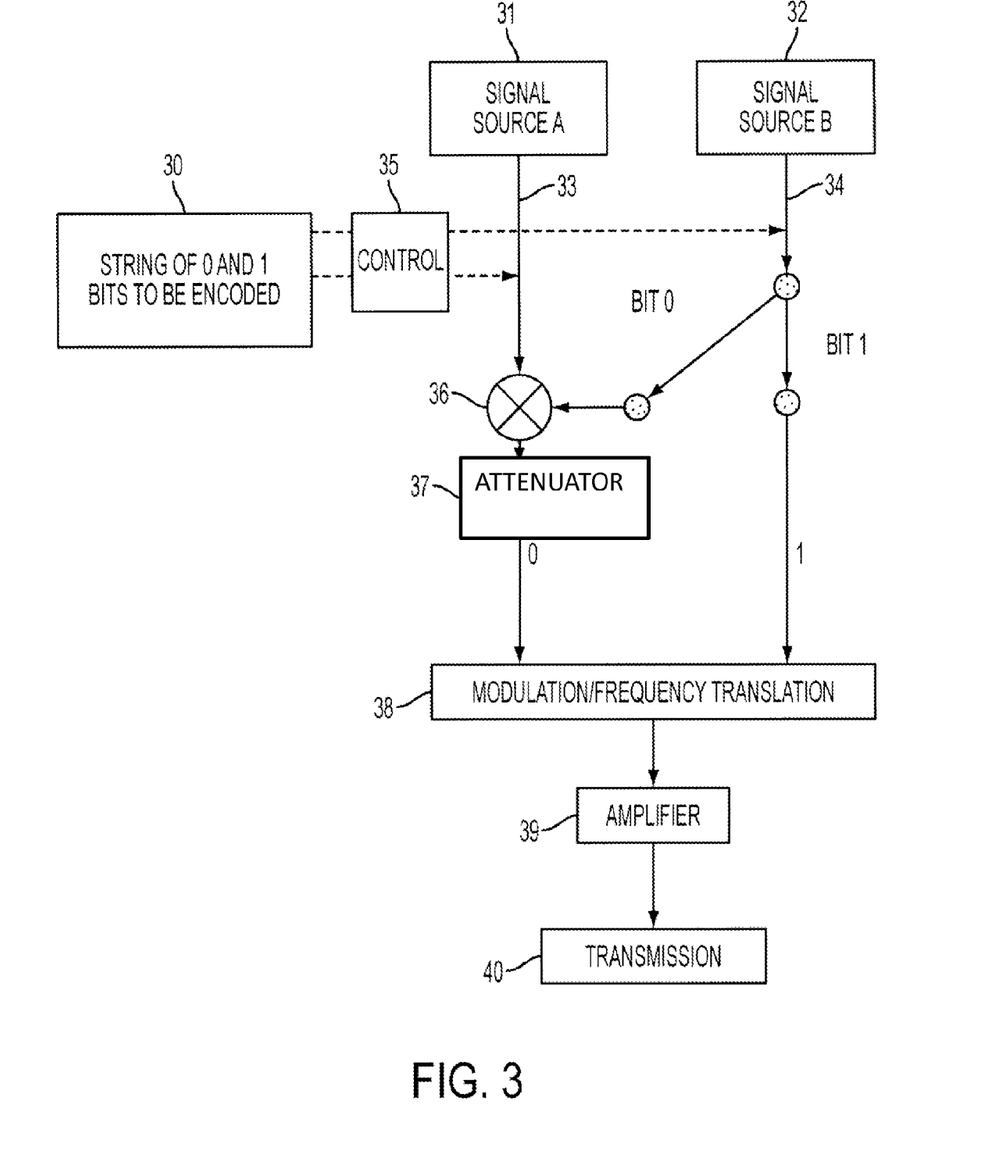
FIG. 3 illustrates an exemplary embodiment of a method for encoding zeros and ones with chaotic signals.

FIG. 3 illustrates an exemplary system and method for implementing this protocol.

Signal source B 32 generates a continuous signal 34 resulting from a set of initial conditions and the chaotic system. Signal source A 31 generates a continuous signal 33 resulting from a different set of initial conditions and the same chaotic system. The signal from source B encodes a bit one. To encode a bit zero, the signal 33 from the source A and the signal from source B 34 are summed 36, and the summation is divided by 2 by an attenuator 37 or other device. A controller 35 turns on and off the signals from signal source A and signal source B in a sequence corresponding to a message of zeros and one to be encoded. The resulting signal stream includes a series of signal portions that encode the zeros and ones.

In this exemplary embodiment, the next bit to be encoded will be encoded with signals from the signal sources with different initial conditions, so the encoding signals will be different than the previously generated signals.

The resulting signal can be further processed to prepare it for transmission 40. For example, the signal can be frequency translated 39, modulated onto a carrier, and/or amplified 39 as needed.

Because the encoded zero and one bits in the transmitted signal have approximately the same energies, a receiver cannot distinguish between a zero and a one on the basis of signal energy. Further, because the chaotic signals in use are ergodic, and uncorrelated, the Fourier spectra for bits 0 and 1 are nearly identical. Therefore, the signals cannot be decoded using standard Fourier analysis techniques, and any decomposition of the chaotic signals onto linear subspaces is not likely to be informative.

Figure 4:
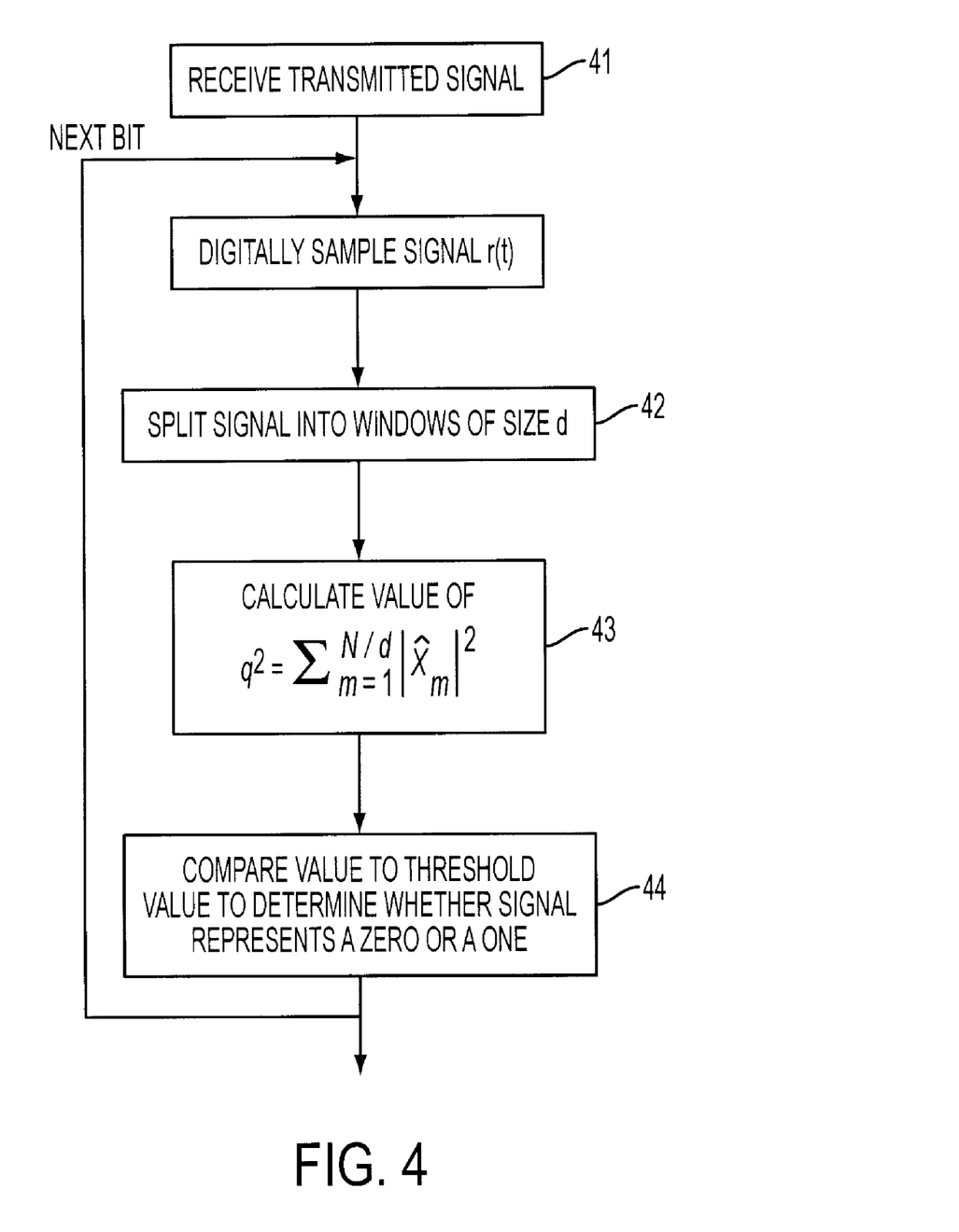
FIG. 4 illustrates an exemplary embodiment of a method for decoding a received transmission into zeros and ones.

FIG. 4 illustrates an exemplary method for receiving and decoding the transmitted signal.

A receiver 41 samples the received signal, and decodes the signals into zero and one bits. An exemplary method for decoding a received series of zeros and ones encoded with chaotic signals relies on a method for determining whether a signal portion encodes a zero or a one based on the chaotic signal's attractor C. If the signal portion has embedded vectors close to or in the attractor set C, the signal portion corresponds to a one bit. If the signal portion has embedded vectors not in the attractor set C, the signal portion corresponds to a zero bit.

A method implementing a detection algorithm for determining whether the received signal portion is described more fully as follows, although other methods can also be used.

A method for detection and estimation of a chaotic time-domain signal $r(t)$ at time points $x(t)=\{r(t), r(t+\tau), \ldots, r(t+(d-1)\tau)\}$ is to determine the closest point $g(t) \in \tilde{C}$ to $x(t)$.

A reconstruction $\tilde{C}$ of the attractor C can be obtained by a method of delayed embedding. Let C represent the generalized cone $C=\{\alpha g : \alpha \in R, g \in G\}$ where G represents the set of vectors embedded as in the $g(t)$ equation above, and whose norm has been set to 1. Given a time domain signal $r(t)$ composed of the chaotic time series (initialized with arbitrary conditions) plus additive noise, an estimate $\hat{x}(t)x(t)$ of the signal r(t) at time points $\{r(t), r(t+\tau), \ldots, r(t+(d-1)\tau)\}$ can be obtained by solving:

$$\hat{x}(t) = \arg\inf_{h \in C} |h - x(t)| \text{ where}$$

$$|x| = \sqrt{\sum_{i=0}^{d-1} x_i^2}.$$

An algorithm for approximating the solution is as follows. First a solution s(t) for the nonlinear system $$\frac{ds(t)}{dt} = F_\theta(s(t))$$

for time $0 \leq t \leq L$ is computed and sampled at time points $t_i = i\tau + B, i = 0, 1, \ldots N-1, N = (L-B)/\tau$. Note that B>0 is used so as to avoid transient phase space points. Next the sampled signal of interest $s(t_i)$ is chosen and a set of embedded vectors $g_i$ is constructed. The discrete 2-norm of each vector $g_i$ is set to one and assembled onto a dictionary D of (N−d) vectors. Now $$\hat{x}(t) = \arg\inf_{h \in C} |h - x(t)|$$

can be approximated by $x(t) = (x'(t)g)g$, where x' is the transpose of x and $$g = \arg\max_{h \in D} |h'x(t)|.$$

The algorithm converges as a function of L, or equivalently, as a function of the size of the dictionary. For almost every noise-free embedded signal x(t), the limit as L approaches infinity of $|\hat{x}(t) - x(t)|$ is zero.

The detection statistic $q^2$ can be used to determine whether the embedded vector of a received signal is in the attractor set C. The statistic $q^2 = |x(t)|^2$ is compared to a threshold value γ, where the threshold value γ has been chosen to satisfy the minimum probability of error. For a time domain signal r(t) digitally sampled at time $t_i = i\tau$, the detection algorithm proceeds by splitting up the time signal of length N into windows of size d 42 and computing 43 the average $$q^2 = \sum_{m=1}^{N/d} |\hat{x}_m|^2,$$

where $\hat{x}_m = \{r(m\tau), \ldots, r(m\tau + (d-1)\tau)\}$.

This algorithm approximates the closest phase space point in C to a given phase space point taken from an incoming signal, based on a discrete representation of C computed by sampling a signal x(t) arising from the chaotic system being used. The detection statistic represents the size (energy) of the point in C closest to the embedded vector from a received signal r(t).

This algorithm is independent of the initial conditions used to generate the dictionary D or the signal r(t) carrying an encoded message. In addition, this algorithm is not dependent on synchronization of two chaotic signals.

Here demodulation requires learning from received signal r(t) whether or not its embedded signals belong to the attractor set C. Using a receiver described by equation $$q^2 = \sum_{m=1}^{N/d} |\hat{x}_m|^2,$$

the value of $q^2$ is compared 44 against a threshold value γ chosen to minimize the probability of making an error Pe (declaring a zero received when in fact a one was sent, or vice versa). The probability of error of error is $P_e = P[D1|H0]P0 + P[D0|H1]P1$ where P[D1|H0] stands for the probability of detecting a signal given that none was present, P[D0|H1] stands for the probability of not detecting a signal given that one was present, P0=P[H0], and P1=P[H1]. Assuming that a large number of data samples is available in a low SNR regime, the statistic $$q^2 = \sum_{m=1}^{N/d} |\hat{x}_m|^2$$

is approximately normally distributed. Thus, P[D1|H0] and P[D0|H1] can be approximated by $$P[D1 | H0] = \int_\gamma^\infty \frac{1}{\sigma_0\sqrt{2\pi}} \exp\left(-\frac{(x-u_o)^2}{2\sigma_0^2}\right) dx$$

$$P[D0 | H1] = \int_{-\infty}^\gamma \frac{1}{\sigma_0\sqrt{2\pi}} \exp\left(-\frac{(x-u_1)^2}{2\sigma_0^2}\right) dx$$

with $u_0(\sigma_0^2)$ and $u_1(\sigma_1^2)$ refer to the means (variances) of the detection statistic $q^2$ under the hypothesis H0 (bit zero sent) and H1 (bit one sent), respectively. Solving for $dP_e/d\gamma = 0$ when $\sigma_1 \neq \sigma_0$, results in $$\gamma = \frac{1b - \sqrt{\Delta}}{2a}$$

with $$a = \frac{1}{2\sigma_1^2} - \frac{1}{2\sigma_0^2}, b = \frac{u_0}{\sigma_0^2} - \frac{u_1}{\sigma_1^2},$$

$$c = \frac{u_1^2}{2\sigma_1^2} - \frac{u_0^2}{2\sigma_0^2} - \ln\left(\frac{p_1\sigma_0}{p_0\sigma_1}\right),$$

and $\Delta = b^2 - 4ac$.

Depending on the value of the detection statistic $q^2$ compared to the threshold value γ, a zero or one bit is assigned, and the process repeats for the next bit/signal portion.

Figure 5:
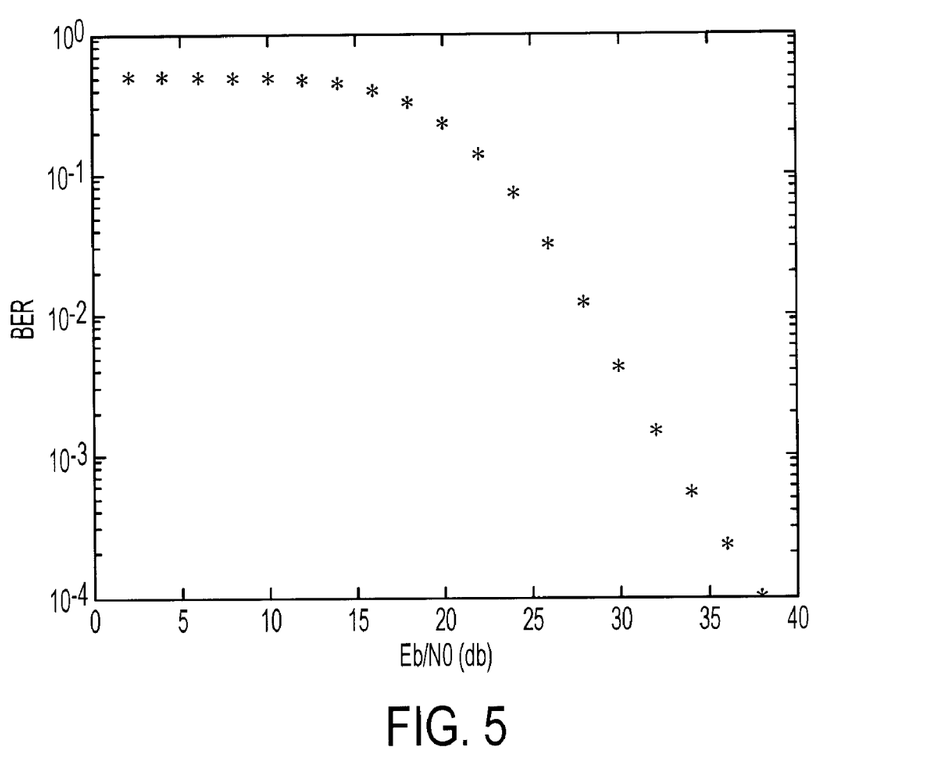
FIG. 5 illustrates the resulting bit error rate for a simulated transmission and decoding of a stream of zeros and ones encoded and decoded using the methods of FIGS. 3 and 4.

FIG. 5 illustrates the bit error rate curve resulting from a Monte Carlo simulation of the system and method of FIGS. 3 and 4. The bit error rate BER or probability of error $P_e$ is computed for different signal to noise ratios by generating 10,000 signals representing bit 0 and 10,000 signals representing bit 1 ($P_0=P_1=0.5$) as described in previous paragraphs. The signals were discretized using the time step $\tau=1/W=9.76\times10^{-10}$. The noise in the signal is assumed uncorrelated and its stationary variance is given by $\sigma^2=N_0W=N_0/2\tau$. The simulations are computed starting from the discretization of the signal s(t) with noise added. The energy of each discretized noiseless chaotic signal is $|s|^2$ is set to be constant throughout the experiments and different levels of noise are added to simulate different SNR.

This binary digital communications protocol using chaotic signals offers physical layer security by encoding bits 0 and 1 with signals whose total energy and power spectral densities are equal. Decoding of the incoming signals is performed by determining whether the incoming signal has embedded vectors belonging to the cone C or not. The knowledge of C (which depends on which chaotic system is chosen and the specific system parameters) provides the security 'key.'

In order to determine whether the incoming signal has embedded vectors belonging to C, an algorithm approximates the closest phase space point in C to a given phase space point taken from an incoming signal. This algorithm is based on a discrete representation of C computed by sampling a signal x(t) arising from the chaotic system being used. The size (energy) of the point in C closest to the embedded vector from a received signal r(t) is used as the detection statistic.

The performance of the chaos-based communications protocol was evaluated through computer simulation using signals arising from a Lorenz nonlinear system, computed using random initial conditions, although other chaotic systems are also suitable for generating signals for encoding the zeros and ones. The Lorenz chaotic system used in the simulation experiment has three nonlinear, ordinary differential equations $dx/dt=k(a(y-x))$; $dy/dt=k(bx-y-xz)$; $dz/dt=k(cz+xy)$ with constant parameters k, a, b, c, and where the time index t was omitted. In this study the parameters were fixed to the values $k=2\times10^7$, $a=10$, $b=28$, and $c=-8/3$. Time series were obtained by numerically integrating the dx/dt, dy/dt, and dz/dt equations using a 5th order Runge-Kutta algorithm with a fixed time step $\Delta t=9.76\times10^{-10}$, B was set to $9.76\times10^{-10}$ seconds, each signal was composed of N=1024 samples, and s(t)=x(t) was taken as the signal of interest. The time step is suitably $\tau=\Delta t=1/W$, where $\pm W$ is the bandwidth of the filtered received signal.

Note that other Lorenz chaotic systems with other k, a, b, and c parameters are also suitable, and other chaotic systems are also suitable for encoding the zeros and ones. For example, Rossler and Henon chaotic systems can be used.

In another embodiment, Rossler system can be described by $dx/dt=k(-y-x)$; $dy/dt=k(x+ay)$; and $dz/dt=k(b+z(x-c))$. Suitable constants are $a=0.15$, $b=0.2$, and $c=10.0$, although other constants can also be used.

A Henon system is described by $x(n+1)=y(n)+1-ax(n)^2$; $y(n+1)=bx(n)$; with constants $a=1.4$ and $b=0.3$. Initial conditions for this discrete Henon map are chose in th range $0<z_{1,2}(0)<0.25$ in order to ensure the solution converged to a stable attractor. Large initial conditions lead to an unbounded system response. As with the Lorenz and Rossler system, the first 1024 transients are discarded as transients.

The advantages of the secure communications protocol proposed here over previous works describing communication systems are that it does not depend on synchronization (it uses an incoherent receiver) it does not depend on exact knowledge of the initial conditions used to generate the signals. In addition, each signal representing bit 1, for example, is different from the previous signals that encoded the previous bit 1. In fact, they are nearly uncorrelated. Note that this algorithm has a computational complexity on the order of the complexity of algorithms using the nearest neighbor searches over the dictionary of vectors defining an approximation to C.

A transmitter incorporating the methods of FIG. 3 can also incorporate forward digital bit error correcting codes.

Other embodiments of the invention include transmitters and receivers, and encoding and decoding devices programmed to accomplish the exemplary methods described herein. The encoded signal can be a communications signal transmitted by optical fiber or traditional copper communications lines, or can be transmitted wirelessly, or can be broadcast over a wide area.

Other embodiments include radar or sonar systems that transmit and/or receive the encoded signals. Other embodiments of the invention include devices such as computer systems and computer-readable media having programs or applications to accomplish the exemplary methods described herein.

The received signal can be amplified or otherwise processed, stored for later retrieval and use, printed using a printer or displayed for a user, transmitted to a computer or other processor for further processing. If the signal represents audio or visual data, a suitable audio or visual display unit can reproduce the signal for the user.

Other embodiments include computer software and computer programs, as well as computer systems and computer readable media having programs for implementing the methods discussed above. A computer system is generally applicable for the various embodiments described according to the present invention. It should be understood that the term "computer system" is intended to encompass any device having a processor that executes instructions from a memory medium. The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include FORTRAN, C, C++, Java, Python and Perl. The computer system can include a processor, a volatile memory, e.g., RAM, a keyboard, a pointing device, e.g., a mouse, a non-volatile memory, e.g., ROM, hard disk, floppy disk, CD-ROM, and DVD, and a display device having a display screen.

The invention has been described with reference to certain preferred embodiments. It will be understood, however, that the invention is not limited to the preferred embodiments discussed above, and that modification and variations are possible within the scope of the appended claims.

What is claimed as new and desired to be protected by Letters Patent of the United States is:

1. A method for encoding zero and one bits for transmission, the method comprising:

initializing each of two different instances of the same non-linear chaotic system with different initial conditions, to produce a first and a second chaotic signal using a computer device;

generating a first signal with only one of the first and second chaotic signals to encode the one bit, with the first signal's embedded vectors being within the non-linear chaotic system's attractor set; and     generating a second signal to encode the zero bit by summing the first and second chaotic signals, resulting in the second signal's embedded vectors being outside the non-linear chaotic system's attractor set.

2. The method according to claim 1, further comprising: weighting at least one of the first signal and the second signal so the first signal and the second signal have approximately equal energy.

3. The method according to claim 1, wherein the non-linear chaotic system is a Lorenz system.

4. The method according to claim 1, wherein the non-linear chaotic system is a Lorenz, Rossler, or Henon system.

5. The method according to claim 1, further comprising: frequency translating the encoded bits.

6. The method according to claim 1, further comprising: transmitting the plurality of encoded bits.

7. The method according to claim 6, further comprising: receiving the transmitted plurality of encoded bits.

8. The method according to claim 7, further comprising: determining whether each signal portion corresponds to a zero bit or a one bit based on comparing a detection statistic to a threshold value, wherein said threshold value incorporates parameters of the non-linear chaotic system equations.

9. The method according to claim 6, further comprising: receiving the transmitted plurality of encoded bits; digitally sampling a received signal at a time interval $\tau$; splitting the signal of length N into windows of a predetermined width d; calculating a detection statistic; comparing the detection statistic to a threshold value; and assigning a bit zero or a bit one based on the comparison of the detection statistic to the threshold value.

* * * * *